US011704572B1

(12) United States Patent
Pronovost et al.

(10) Patent No.: US 11,704,572 B1
(45) Date of Patent: Jul. 18, 2023

(54) OFFLOADING FOR GRADIENT COMPUTATION

(71) Applicant: Zoox, Inc., Foster City, CA (US)

(72) Inventors: Ethan Miller Pronovost, Pasadena, CA (US); Ethan Petrick Dreyfuss, Redwood City, CA (US)

(73) Assignee: Zoox, Inc., Foster City, CA (US)

( * ) Notice: Subject to any disclaimer, the term of this patent is extended or adjusted under 35 U.S.C. 154(b) by 1,081 days.

(21) Appl. No.: 16/163,438

(22) Filed: Oct. 17, 2018

(51) Int. Cl.
*G06N 5/04* (2023.01)
*G06N 3/063* (2023.01)
*G06T 1/20* (2006.01)
*G06F 9/38* (2018.01)
*G06N 3/084* (2023.01)

(52) U.S. Cl.
CPC ............ *G06N 3/084* (2013.01); *G06F 9/3877* (2013.01); *G06N 3/063* (2013.01); *G06N 5/04* (2013.01); *G06T 1/20* (2013.01)

(58) Field of Classification Search
CPC ......... G06N 3/063; G06N 5/04; G06F 9/3877; G06T 1/20

See application file for complete search history.

(56) References Cited

U.S. PATENT DOCUMENTS 11,138,494 B2 * 10/2021 Feng et al. ............... G06N 3/04
11,244,226 B2 * 2/2022 Munkberg et al. .... G06N 3/084
(Continued)

OTHER PUBLICATIONS

"Any way to control the order of send/recv (host to device data transfer) explicitly?", retrieved on the internet on Sep. 28, 2018 at <<https://github.com/tensorflow/tensorflow/issues/12818#issuecomment-355175109>>, 4 pages.
"Tensorflow", retrieved on the internet on Sep. 28, 2018 at <<http://www.tensorflow.org/api_docs/python/tf/ gradients>>, 3 pages.
Bulatov, Yaroslav, "Fitting larger networks into memory", retrieved from the internet on 9/7/18 at <<https://medium.com/tensorflow/fitting-larger-networks-into-memory-583e3c758ff9>>, 16 pages.
(Continued)

*Primary Examiner* — Casey R. Garner
(74) *Attorney, Agent, or Firm* — Lee & Hayes, P.C.

(57) ABSTRACT

Techniques for selectively offloading data that is computed by a first processing unit during training of an artificial neural network onto memory associated with a second processing unit and transferring the data back to the first processing unit when the data is needed for further processing are described herein. For example, the first processing unit may compute activations for operations associated with forward propagation. During the forward propagation, one or more of the activations may be transferred to a second processing unit for storage. Then, during backpropagation for the artificial neural network, the activations may be transferred back to the first processing unit as needed to compute gradients.

20 Claims, 7 Drawing Sheets

(56) References Cited

U.S. PATENT DOCUMENTS

2019/0286991 A1* 9/2019 Lee et al. ............ G06F 12/023
2019/0324856 A1* 10/2019 Zhao et al. ............ G06T 1/20
2020/0380344 A1* 12/2020 Lie et al. ............ G06N 7/005

OTHER PUBLICATIONS

Rhu, Minsoo, et al., "vDNN: Viirtualized Deep Neural Networks for Scalable, Memory-Efficient Neural Network Design", retrieved from the internet on Sep. 7, 2018 at <<https://arxiv.org/abs/1602.08124>>, 3 pages.

Rhu, Minsoo, et al., "vDNN: Virtualized Deep Neural Networks for Scalable, Memory-Efficient Neural Network Design", Santa Clara, California, Jul. 28, 2016, 13 pages.

Rhu, Minsoo, Mike O'Connor, Niladrish Chatterjee, Jeff Pool, Youngeun Kwon, and Stephen W. Keckler. "Compressing DMA engine: Leveraging activation sparsity for training deep neural networks." In 2018 IEEE International Symposium on High Performance Computer Architecture (HPCA), pp. 78-91. IEEE, 2018. (Year: 2018).*

Bulatov, Yaroslav "Backprop and systolic arrays", retrieved from the internet on 9/7/18 at <<https://medium.com/@yaroslavvb/backprop-and-systolic-arrays-24e925d2050>>, 7 pages.

* cited by examiner

OFFLOADING FOR GRADIENT COMPUTATION

BACKGROUND

Artificial neural networks often learn to perform a task by considering training data. For example, image data that has been previously associated with a classification may be fed into an artificial neural network to train the artificial neural network to recognize the classification. During training, a Graphics Processing Unit (GPU) stores all activations that are computed during forward propagation for the artificial neural network, and then uses those activations during backwards propagation. This requires a relatively large amount of memory on the GPU. Further, this limits the amount of data that can be fed into an artificial neural network for training. In cases where learning a task requires a specific amount of training data, and that amount of training data uses more memory during training than that available on a GPU or even a cluster of GPUs, an artificial neural network may not be trained for some tasks. In other words, such memory constraints on GPUs leave some tasks as untrainable.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
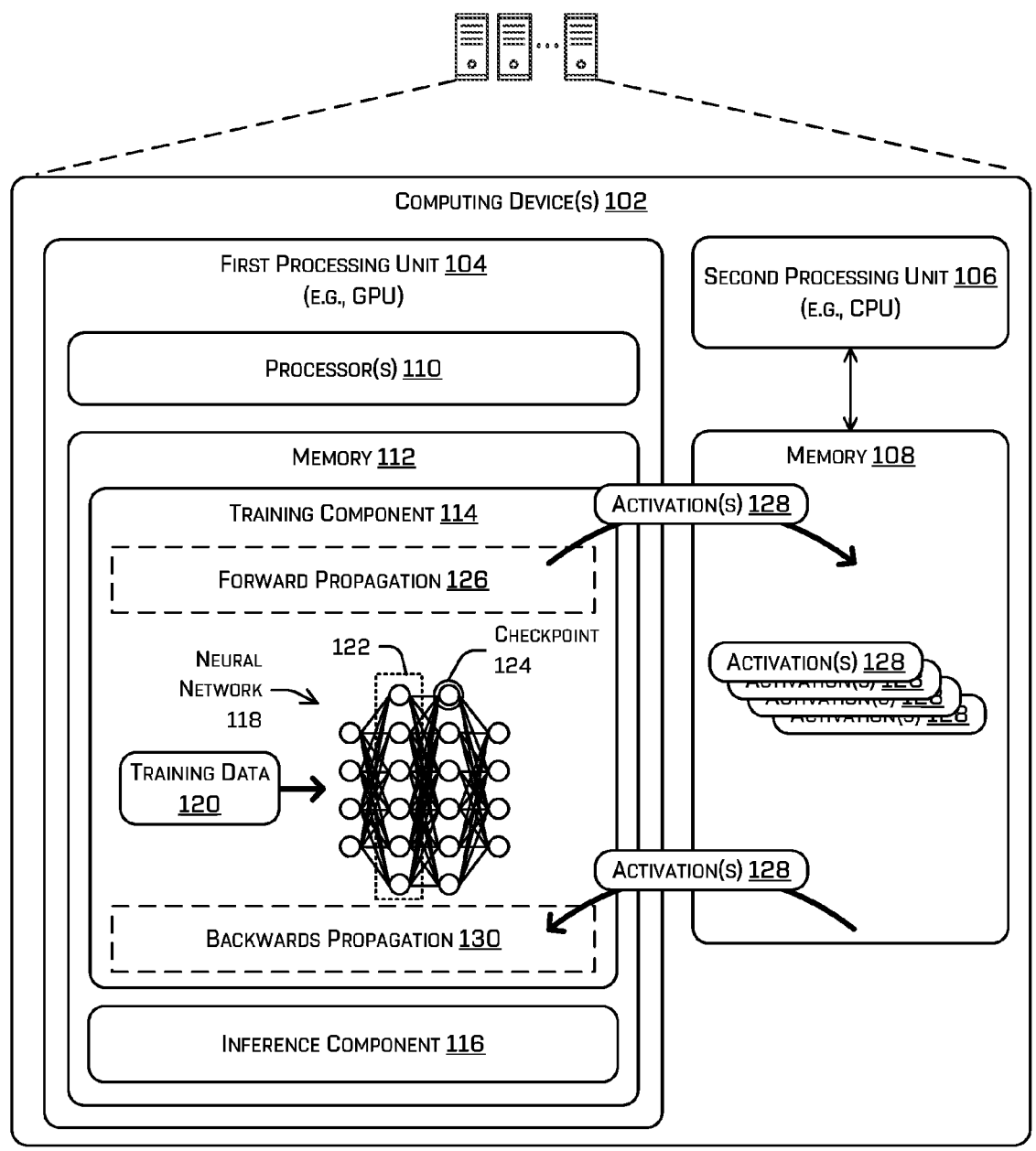
FIG. 1 illustrates an example environment in which the techniques discussed herein may be implemented.

This disclosure is directed to techniques for selectively offloading data that is computed by a first processing unit during training of an artificial neural network onto memory associated with a second processing unit and transferring the data back to the first processing unit when the data is needed for further processing. For example, a Graphics Processing Unit (GPU) may compute activations for operations associated with forward propagation for an artificial neural network. During the forward propagation, one or more of the activations (e.g., associated weights and/or outputs from an intermediate layer) may be transferred to a Central Processing Unit (CPU) for storage. This may free-up memory on the GPU to execute further operations. Then, during backwards propagation for the artificial neural network, the activations may be transferred back to the GPU as needed to compute gradients. This reduces memory requirements on the GPU, in comparison to other techniques that maintain activations on the GPU. Further, this allows a relatively large amount of data to be fed into an artificial neural network for training, which may facilitate the training of multiple types of models. Moreover, in some cases, this may reduce training time for the artificial neural network.

In many examples, an artificial neural network may be trained to perform one or more tasks. Such training includes forward propagation and backwards propagation. During forward propagation (also referred to as a forward pass), data may be input into the artificial neural network to compute activations at layers within the artificial neural network, and ultimately, an output. Each layer may be associated with one or more operations (or nodes) and each operation may be associated with a weight. During backwards propagation (also referred to as a backwards pass or backpropagation), an error representing a difference between the output and a desired output may be propagated backwards through the layers of the artificial neural network to adjust the weights (e.g., using gradient descent). The backwards propagation may include executing one or more gradient operations associated with the one or more operations of the forward propagation to generate one or more gradients.

As noted above, the techniques discussed herein may selectively offload data that is computed by a first processing unit during training of an artificial neural network onto external memory. For example, during forward propagation, the first processing unit, such as a GPU, may execute operations to generate activations and store those activations in memory associated with the first processing unit. In examples, if an operation is associated with a checkpoint, an activation that is computed by the operation may be maintained so that the activation does not need to be recomputed during backwards propagation. Although in other examples, activations may be maintained in other manners.

In this example, during forward propagation, the first processing unit executes a first operation that is associated with a first checkpoint to generate a first activation. The first processing unit may store the first activation into memory associated with the first processing unit. In addition, based on the first operation being associated with the first checkpoint, the first processing unit may cause the first activation to be stored onto memory that is external to the first processing unit, such as memory associated with a second processing unit (e.g., Central Processing Unit (CPU)). The first processing unit may then deallocate a portion of memory associated with the first processing unit where the first activation was stored. The first processing unit may continue to execute operations during the forward propagation of the artificial neural network and use the portion of the memory associated with the first processing unit where the first activation was stored.

Thereafter, during backwards propagation, the first activation may be returned to the first processing unit when needed to compute a gradient. For example, the first processing unit may determine that an operation that takes the first activation as input is about to be executed (e.g., is one of the next few operations to be executed). The first processing unit may then cause the first activation to be returned from the memory that is external to the first processing unit and stored in the memory associated with the first processing unit. The first processing unit may then access the first activation from the memory associated with the first processing unit to recompute an activation. The recomputed activation may be used to compute a gradient.

In at least some examples, the number of checkpoints and the times at which such checkpoints are transferred from one source (e.g., a CPU memory) to a second source (e.g., a GPU memory) for back propagation calculations may be determined, for example, based at least in part on a computational speed and memory availability in either source. As a non-limiting example, such transference may be delayed until necessary for computation to allow for the greatest possible memory availability in the second source. Alternatively, one or more checkpoints may be transferred prior to their need in a gradient calculation to speed up such calculations at the expense of available memory in the second source.

In many examples, the techniques discussed herein may be implemented in the context of a single node (e.g., neuron) and/or a group of nodes associated with a layer of a neural network. In one example, the techniques may offload a plurality of activations (e.g., stored in an array, separately, etc.) for a particular layer of a neural network that is associated with a checkpoint, and return the plurality of activations together when needed. In another example, the techniques may offload one or more activations for any number of layers.

Further, although many examples are discussed in the context of offloading activations associated with nodes, additionally, or alternatively, the techniques may be implemented to offload weights associated with nodes as well.

In examples, the offloading techniques discussed herein may reduce memory requirements on a processing unit to train an artificial neural network. For example, by offloading activations stored in memory of a GPU onto external memory, the techniques may use the memory of the GPU to store other activations or data. This reduces memory requirements on the GPU, in comparison to other techniques that maintain activations on the GPU. Further, the offloading techniques allow a larger amount of data to be fed into an artificial neural network for training, in comparison to other techniques. For example, a size of a minibatch that is fed into an artificial neural network may be increased. This may allow an artificial neural network to be trained for some tasks that were previously untrainable due to the relatively large memory requirements for the other training techniques. For example, using a larger amount of training data may increase the number of classifications that an artificial neural network can handle. Additionally, or alternatively, increasing the size of a minibatch may aid in convergence of such training, requiring fewer total minibatches to be introduced into the network for training. Moreover, the offloading techniques may reduce training time on an artificial neural network.

The methods, apparatuses, and systems described herein can be implemented in a number of ways. Example implementations are provided below with reference to the following figures. Although discussed in the context of an autonomous vehicle, in some examples, the methods, apparatuses, and systems described herein can be applied to a variety of systems. In another example, the methods, apparatuses, and systems can be utilized in an aviation or nautical context. Additionally, or alternatively, the techniques described herein can be used with real data (e.g., captured using sensor(s)), simulated data (e.g., generated by a simulator), or any combination thereof.

FIG. 1 illustrates an example environment 100 in which the techniques discussed herein may be implemented. In particular, the environment 100 includes a computing device(s) 102 that includes a first processing unit 104, a second processing unit 106, and memory 108 associated with the second processing unit 106. The first processing unit 104 (e.g., a processor(s) 110 associated with the first processing unit 104) and the second processing unit 106 may each comprise one or more GPUs, one or more CPUs, one or more tensor processing units, one or more neural processing units, one or more digital signal processors, etc. In many examples, the first processing unit 104 is implemented as a GPU and the second processing unit 106 is implemented as a CPU, although other configurations may be used. As illustrated, the first processing unit 104 may include the processor(s) 110 and memory 112. The memory 112 may store a training component 114 and an inference component 116 that are executable by the processor(s) 110. Further, though the first processing unit 104 and second processing unit 106 are depicted in FIG. 1 as residing in the same computing device 102, such a depiction is for illustrative purposes, as the processing units may be in separate units, which may or may not be local. Additionally, or alternatively, other memory may be made available for techniques described herein (e.g., file systems on hard disk drives, solid state drives, and the like) to transfer activations between any of memory 112 or 108 and the additional memory locations.

The training component 114 may be executed by the processor(s) 110 to train a neural network 118 (also referred to as "artificial neural network 118") based on training data 120. The training data 120 may include a wide variety of data, such as image data, video data, LIDAR data, radar data, audio data, other sensor data, etc., that is associated with a value (e.g., a desired classification, inference, prediction, etc.). Such values may generally be referred to as a "ground truth." To illustrate, the training data 120 may be used for image classification and, as such, may include an image of an environment that is captured by an autonomous vehicle and that is associated with one or more classifications based on user input (e.g., user input indicating that the image depicts a specific type of object). In some examples, such labeled classifications (or more generally, the labeled output associated with training data) may be referred to as ground truth. During training, the training component 114 may selectively offload data that is computed by the training component 114 (and stored, at least temporarily, in the memory 112) onto the memory 108 associated with the second processing unit 106. The training component 114 may cause the data to be transferred back to the memory 112 associated with the first processing unit 104 when the data is needed during training.

The inference component 116 may be executed by the processor(s) 110 to process new data with the neural network 118 and make an inference regarding the new data (e.g., predict a value, classify the new data, etc.). To illustrate, the inference component 116 may implement the neural network 118 to classify objects in a new image captured by an autonomous vehicle. While implementing the neural network 118, the inference component 116 may not perform backwards propagation, since backwards propagation is used to train the neural network 118.

Data that is used by the training component 114 (e.g., the training data 120) and/or the inference component 116 (e.g., data that is fed into the neural network 118 for inference) may include a variety of data. For example, the data may include depth data from one or more sensors, such as Light Detection and Ranging (LIDAR) data, Radar data, image data (as determined from multi-view geometry), depth sensor data (time of flight, structured light, etc.), etc. In some examples, the computing device(s) 102 may receive (e.g., retrieve) data from a data store, such as a database. Here, the data store can store data over time as the data is received from one or more vehicles or other devices within an environment. In some examples, the computing device(s) 102 may receive data from one or more vehicles or other devices as the data is being captured (e.g., real-time), in a batched manner, in one or more log files received from a vehicle, or at any other time. In some examples, the computing device(s) 102 may receive a plurality of LIDAR datasets from a plurality of LIDAR sensors operated in connection with a perception system of an autonomous vehicle. In some examples, the computing device(s) 102 may combine or fuse data from two or more LIDAR sensors into a single LIDAR dataset (also referred to as a "meta spin"). In some examples, the computing device(s) 102 may extract a portion of LIDAR data for processing, such as over a period of time. In some examples, the computing device(s) 102 may receive Radar data and associate the Radar data with the LIDAR data to generate a more detailed representation of an environment. In one illustration, data includes LIDAR data (e.g., point clouds) associated with various objects in an urban environment, such as cars, trucks, roads, buildings, bikes, pedestrians, etc. Of course, such data need not be sensor data at all. In various examples, training data may comprise features defined for a particular problem and their associated expected output. As a non-limiting example, such data may comprise house square foot size, a number of bedrooms, a number of floors, etc., with an associated home sale price for training a network to predict a houses likely sale price.

As illustrated, the neural network 118 may include a plurality of layers. Each layer may include one or more nodes (also referred to as neurons or perceptrons). In the example of FIG. 1, the neural network 118 includes four layers and a layer 122 includes six nodes. However, it can be understood that any number of layers and/or nodes may be implemented. In examples, the neural network 118 may include a bias node(s), not illustrated in FIG. 1. A node, such as a node associated with a hidden layer, may be associated with an operation and a weight. An operation at one layer may be executed to generate an activation, which is provided to a next layer as input (e.g., to an operation associated with the next layer in a forward graph). Such activations may be, for example, a sigmoid function, arctan, ReLU, hyperbolic arctan, Heaviside, and the like.

In examples, the neural network 118 may be associated with one or more checkpoints to assist in training the neural network 118. A checkpoint may designate a point at which to maintain data (e.g., save data for future use). For example, if a node (or layer) is associated with a checkpoint, an activation that is generated by an operation at the node during forwards propagation may be stored until the activation is needed to compute a gradient associated with the node during backwards propagation. By maintaining the activation, this may avoid having to recompute the activation (e.g., in part of a forward graph) when needed in the backwards propagation. Further, using a checkpoint in this manner may provide a starting point for additional calculations without having to compute previous activations (e.g., for those nodes in between saved activations). Although other nodes in the neural network 118 may be associated with checkpoints, for ease of illustration a single node is shown in FIG. 1 as being associated with a checkpoint 124.

A checkpoint may be associated with a node in a variety of manners. In one example, a user may select a node or layer to be associated with a checkpoint. In another example, a system, application, or other entity may select a node or layer to be associated with a checkpoint. In some examples, a particular number of nodes or layers may be associated with checkpoints, such as 30%, 40%, 50%, etc. of nodes or layers in an artificial neural network. In examples, a number of checkpoints associated with an artificial neural network may vary to account for different models of an artificial neural network. In at least some examples, the number of checkpoints is determined based on an optimal (or desired) available memory size of memory 112 and/or an optimal (or desired) computation speed for backpropagation. As a non-limiting example, though every node (or layer) may be checkpointed, this may require additional computational resources for transferring memory to and from memory 112.

As noted above, the training component 114 may process the training data 120 to train the neural network 118. For example, during forward propagation 126 of the neural network 118, the training component 114 may compute an activation(s) 128 for operations associated with the neural network 118. In examples, after computation, the activation(s) 128 may be stored in the memory 112, even if temporarily. Then, the training component 114 may cause one or more of the activation(s) 128 to be transferred to the memory 108 associated with the second processing unit 106. For example, if an activation is computed for a node, and that node is associated with a checkpoint, the training component 114 may cause the activation to be transferred from the memory 112 to the memory 108. After transferring an activation to the memory 108, a portion of the memory 112 that was used for storing the activation may be deallocated for use by the training component 114 in computing further activations or for other processing. As described above, such activation(s) 128 may further be transferred to other storage and/or memory on computing device 102, or remote therefrom.

During backwards propagation 130 of the neural network 118, the training component 114 may cause the activation(s) 128 that are stored on the memory 108 to be transferred back to the memory 112 as needed to compute gradients. For example, assume that an artificial neural network is associated with a first checkpoint at a first node and a second checkpoint at a second node that is farther forward in the artificial neural network than the first checkpoint with respect to a forward graph for the artificial neural network (e.g., the second checkpoint is reached after the first checkpoint in a forward propagation). Also, assume that there exists a connection from the first checkpoint to the second checkpoint (e.g., the first checkpoint may connect to the second checkpoint through a path that includes one or more nodes and no additional checkpoints). Further, assume that a first activation associated with the first node is transferred to the memory 108 during forward propagation.

In this example, during backwards propagation, the training component 114 may determine that a specific gradient operation is being executed or has just been executed. The specific gradient operation may be associated with the second checkpoint (e.g., may be an operation to compute a gradient for the second node). Upon determining that the specific gradient operation is being executed or has just been executed, the training component 114 may cause the first activation to be transferred back into the memory 112 associated with the first processing unit 104.

The training component 114 may access the first activation from the memory 112 to facilitate generation of a gradient. For example, the training component 114 may use the first activation to execute one or more operations associated with a subgraph of the forward graph (e.g., a copy of the subgraph) to recompute an activation for the subgraph. The activation may be used to compute a gradient. An example of backwards propagation is discussed in further detail below.

Although the training component 114 and the inference component 116 are illustrated in FIG. 1 as being stored on the memory 112 and implemented by the first processing unit 104, the training component 114 and/or the inference component 116 may be stored on the memory 108 and/or implemented by the second processing unit 106.

The computing device(s) 102 may be implemented as one or more laptop computers, desktop computers, servers, and so on. In examples, the computing device(s) 102 is configured in a cluster, data center, cloud computing environment, or a combination thereof. In one example, the computing device(s) 102 provides cloud computing resources, including computational resources, network resources, storage resources, and the like, that operate remotely to another computing device, such as a client device. To illustrate, the computing device(s) 102 may implement a cloud computing platform/infrastructure for building, deploying, and/or managing applications and/or services.

The memory 112 and/or the memory 108 are examples of non-transitory computer-readable media. The memory 112 and/or the memory 108 may store an operating system and/or one or more software applications, instructions, programs, and/or data to implement the methods described herein and the functions attributed to the various systems. In various implementations, memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

In some examples, the memory 112 may have different characteristics than the memory 108. For example, the memory 112 and the memory 108 may have different memory capacities, different abilities to read and/or write (e.g., one having the ability to read and write at the same time, while the other having the ability to read and write at different times), different read/write speeds, different sized memory buses (e.g., 64-bit, 128-bit, etc.), and so on. Further, the first processing unit 104 may have different characteristics than the second processing unit 106, such as different operating speeds, different number of cores, etc.

Although the second processing unit 106 and the memory 108 are illustrated as being part of the computing device(s) 102, in some examples the second processing unit 106 and/or the memory 108 may be located elsewhere. For example, the second processing unit 106 and/or the memory 108 may be implemented on a computing device that is remote to the computing device(s) 102.

The techniques discussed herein may be implemented in various contexts. In some examples, the techniques are implemented in the context of a machine learning application, such as TensorFlow, PyTorch, Caffe, Caffe2, etc.

Figure 2:
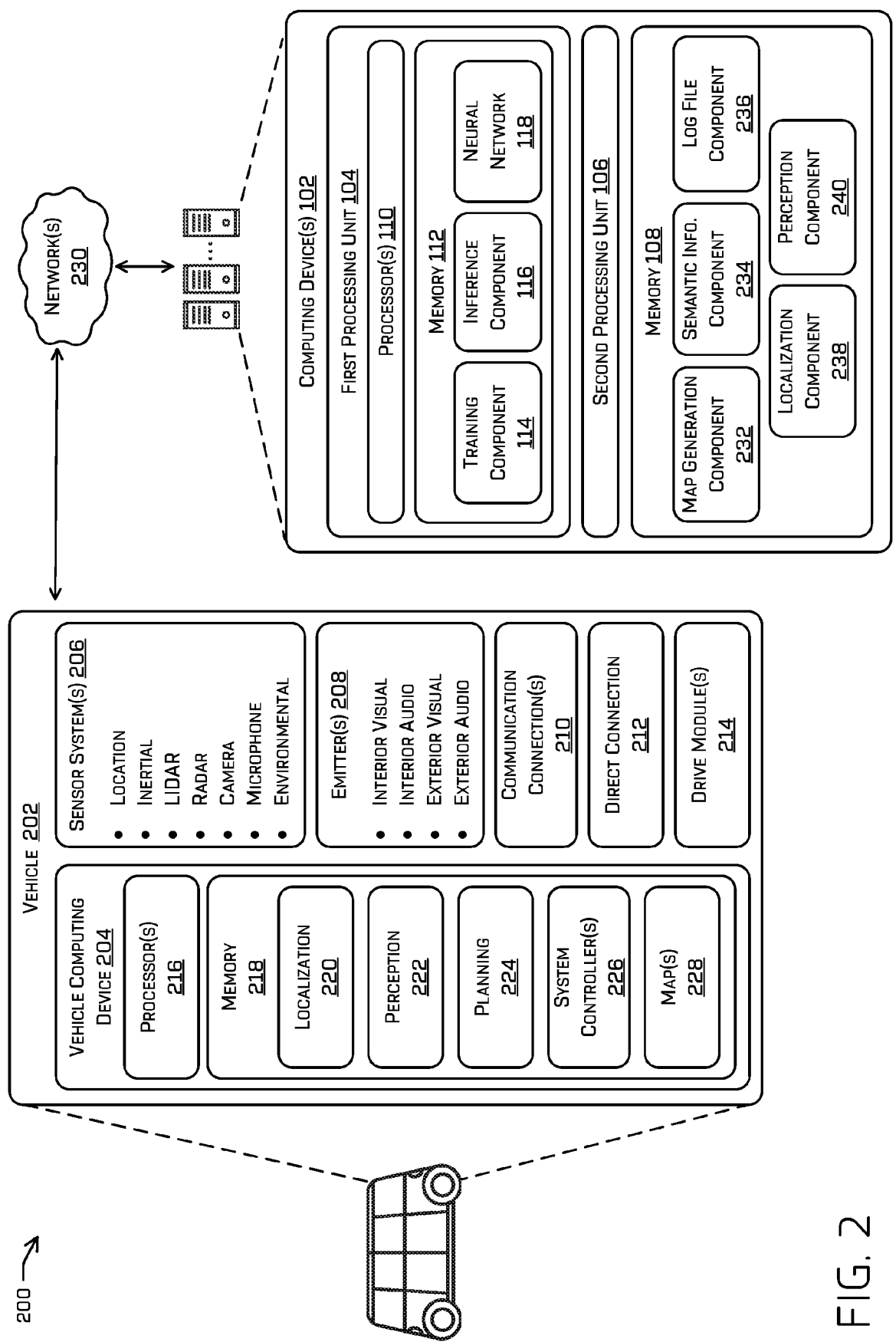
FIG. 2 depicts a block diagram of an example system for implementing the techniques described herein.

FIG. 2 depicts a block diagram of an example system 200 for implementing the techniques described herein. In an example, the system 200 can include a vehicle 202 and the computing device(s) 102 of FIG. 1.

The vehicle 202 can include a vehicle computing device 204, one or more sensor systems 206, one or more emitters 208, one or more communication connections 210, at least one direct connection 212, and one or more drive modules 214.

The vehicle computing device 204 can include one or more processors 216 and memory 218 communicatively coupled with the one or more processors 216. In the illustrated example, the vehicle 202 is an autonomous vehicle; however, the vehicle 202 could be any other type of vehicle. In the illustrated example, the memory 218 of the vehicle computing device 204 stores a localization component 220, a perception component 222, a planning component 224, one or more system controllers 226, and one or more maps 228. Though depicted in FIG. 2 as residing in memory 218 for illustrative purposes, it is contemplated that the localization component 220, the perception component 222, the planning component 224, the one or more system controllers 226, and the one or more maps 228 can additionally, or alternatively, be accessible to the vehicle 202 (e.g., stored remotely).

In at least one example, the localization component 220 can include functionality to receive data from the sensor system(s) 206 to determine a position of the vehicle 202. For example, the localization component 220 can include and/or request/receive a three-dimensional map of an environment and can continuously determine a location of the autonomous vehicle within the map. In some instances, the localization component 220 can utilize SLAM (simultaneous localization and mapping) or CLAMS (calibration, localization and mapping, simultaneously) to receive image data, LIDAR data, Radar data, IMU data, GPS data, wheel encoder data, and the like to accurately determine a location of the autonomous vehicle. In some instances, the localization component 220 can provide data to various components of the vehicle 202 to determine an initial position of an autonomous vehicle for generating a candidate trajectory, as discussed herein.

In some instances, the perception component 222 can include functionality to perform object detection, segmentation, and/or classification. In some examples, the perception component 222 can provide processed sensor data that indicates a presence of an entity that is proximate to the vehicle 202 and/or a classification of the entity as an entity type (e.g., car, pedestrian, cyclist, building, tree, road surface, curb, sidewalk, unknown, etc.). In additional and/or alternative examples, the perception component 222 can provide processed sensor data that indicates one or more characteristics associated with a detected entity and/or the environment in which the entity is positioned. In some examples, characteristics associated with an entity can include, but are not limited to, an x-position (global position), a y-position (global position), a z-position (global position), an orientation, an entity type (e.g., a classification), a velocity of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

In general, the planning component 224 can determine a path for the vehicle 202 to follow to traverse through an environment. For example, the planning component 224 can determine various routes and trajectories and various levels of detail. For example, the planning component 224 can determine a route to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, the planning component 224 can generate an instruction for guiding the autonomous vehicle along at least a portion of the route from the first location to the second location. In at least one example, the planning component 224 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (i.e., within technical tolerances) in accordance with a receding horizon technique.

In at least one example, the vehicle computing device 204 can include one or more system controllers 226, which can be configured to control steering, propulsion, braking, safety, emitters, communication, and other systems of the vehicle 202. These system controller(s) 226 can communicate with and/or control corresponding systems of the drive module(s) 214 and/or other components of the vehicle 202.

The memory 218 can further include one or more maps 228 that can be used by the vehicle 202 to navigate within the environment. For the purpose of this discussion, a map can be any number of data structures modeled in two dimensions or three dimensions that are capable of providing information about an environment, such as, but not limited to, topologies (such as intersections), streets, mountain ranges, roads, terrain, and the environment in general. In one example, a map can include a three-dimensional mesh. In some instances, the map can be stored in a tiled format, such that individual tiles of the map represent a discrete portion of an environment, and can be loaded into working memory as needed. In some instances, the maps 228 can be divided into tiles by the vehicle computing device 204, by the computing device(s) 102, or by a combination of the two.

In some examples, the one or more maps 228 can be stored on a remote computing device(s) (such as the computing device(s) 102) accessible via network(s) 230. In some examples, multiple maps 228 can be stored based on, for example, a characteristic (e.g., type of entity, time of day, day of week, season of the year, etc.). Storing multiple maps 228 can have similar memory requirements, but increase the speed at which data in a heat map can be accessed.

In some instances, aspects of some or all of the components discussed herein can include any models, algorithms, and/or machine learning algorithms. For example, in some instances, the components in the memory 218 can be implemented as a neural network, such as the neural network 118. To illustrate, the perception component 222 may use a neural network to analyze various sensor data (e.g., LIDAR data, Radar data, image data (as determined from multi-view geometry), depth sensor data (time of flight, structured light, etc.), etc.) to perform object detection, segmentation, and/or classification, such as identifying an object depicted in the sensor data, segmenting the sensor data into one or more portions, identifying a classification of the sensor data or a portion of the sensor data, etc. Any such neural network may be trained in accordance with the techniques described herein.

An exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naive Bayes, Gaussian naive Bayes, multinomial naive Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet60, ResNet101, VGG, DenseNet, PointNet, and the like.

In at least one example, the sensor system(s) 206 can include LIDAR sensors, Radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, etc.), microphones, wheel encoders, environment sensors (e.g., temperature sensors, humidity sensors, light sensors, pressure sensors, etc.), etc. The sensor system(s) 206 can include multiple instances of each of these or other types of sensors. For instance, the LIDAR sensors can include individual LIDAR sensors located at the corners, front, back, sides, and/or top of the vehicle 202. As another example, the camera sensors can include multiple cameras disposed at various locations about the exterior and/or interior of the vehicle 202. The sensor system(s) 206 can provide input to the vehicle computing device 204. Additionally, and/or alternatively, the sensor system(s) 206 can send sensor data, via the one or more networks 230, to the one or more computing device(s) at a particular frequency, after a lapse of a predetermined period of time, in near real-time, etc.

The vehicle 202 can also include one or more emitters 208 for emitting light and/or sound, as described above. The emitters 208 in this example include interior audio and visual emitters to communicate with passengers of the vehicle 202. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 208 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which can comprise acoustic beam steering technology.

The vehicle 202 can also include one or more communication connection(s) 210 that enable communication between the vehicle 202 and one or more other local or remote computing device(s). For instance, the communication connection(s) 210 can facilitate communication with other local computing device(s) on the vehicle 202 and/or the drive module(s) 214. Also, the communication connection(s) 210 can allow the vehicle to communicate with other nearby computing device(s) (e.g., other nearby vehicles, traffic signals, etc.). The communications connection(s) 210 also enable the vehicle 202 to communicate with a remote teleoperations computing device or other remote services.

The communications connection(s) 210 can include physical and/or logical interfaces for connecting the vehicle computing device 204 to another computing device or a network, such as network(s) 230. For example, the communications connection(s) 210 can enable Wi-Fi-based communication such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s).

In at least one example, the vehicle 202 can include one or more drive modules 214. In some examples, the vehicle 202 can have a single drive module 214. In at least one example, if the vehicle 202 has multiple drive modules 214, individual drive modules 214 can be positioned on opposite ends of the vehicle 202 (e.g., the front and the rear, etc.). In at least one example, the drive module(s) 214 can include one or more sensor systems to detect conditions of the drive module(s) 214 and/or the surroundings of the vehicle 202. By way of example and not limitation, the sensor system(s) can include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, LIDAR sensors, Radar sensors, etc. Some sensors, such as the wheel encoders can be unique to the drive module(s) 214. In some cases, the sensor system(s) on the drive module(s) 214 can overlap or supplement corresponding systems of the vehicle 202 (e.g., sensor system(s) 206).

The drive module(s) 214 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive module(s) 214 can include a drive module controller which can receive and preprocess data from the sensor system(s) and to control operation of the various vehicle systems. In some examples, the drive module controller can include one or more processors and memory communicatively coupled with the one or more processors. The memory can store one or more modules to perform various functionalities of the drive module(s) 214. Furthermore, the drive module(s) 214 also include one or more communication connection(s) that enable communication by the respective drive module with one or more other local or remote computing device(s).

In at least one example, the localization component 220, perception component 222, and/or the planning component 224 can process sensor data, as described above, and can send their respective outputs, over the one or more network(s) 230, to the computing device(s) 102. In at least one example, the localization component 220, the perception component 222, and/or the planning component 224 can send their respective outputs to the computing device(s) 102 at a particular frequency, after a lapse of a predetermined period of time, in near real-time, etc.

The vehicle 202 can send sensor data to the computing device(s) 102, via the network(s) 230. In some examples, the vehicle 202 can send raw sensor data to the computing device(s) 102. In other examples, the vehicle 202 can send processed sensor data and/or representations of sensor data to the computing device(s) 102. In some examples, the vehicle 202 can send sensor data to the computing device(s) 102 at a particular frequency, after a lapse of a predetermined period of time, in near real-time, etc. In some cases, the vehicle 202 can send sensor data (raw or processed) to the computing device(s) 102 as one or more log files. The computing device(s) 102 can receive the sensor data (raw or processed) and can generate and/or update maps based on the sensor data.

In examples, the vehicle 202 can generate various log file(s) representing sensor data captured by the vehicle 202. For example, a log file can include, but is not limited to, sensor data captured by one or more sensors of the vehicle 202 (e.g., LIDAR sensors, Radar sensors, sonar sensors, wheel encoders, inertial measurement units (IMUs) (which can include gyroscopes, magnetometers, accelerometers, etc.), GPS sensors, image sensors, and the like). route information, localization information, and the like. In some cases, a log file(s) can include a log of all sensor data captured by the vehicle 202, decisions made by the vehicle 202, determinations made regarding segmentation and/or classification, and the like. A log files(s) can be sent to and received by the computing device(s) 102.

In at least one example, in addition to the components mentioned in FIG. 1, the computing device(s) 102 can store (in the memory 108) a map generation component 232, a semantic information component 234, a log file component 236, a localization component 238, and a perception component 240. Although illustrated as being implemented on the computing device(s) 102, any one or more of the components 232-240 (and/or the components 114 and/or 116, or the neural network 118) may be implemented on the vehicle 202, such as stored within the memory 218 of the vehicle computing device 204 and executed by the processor(s) 216 of the vehicle computing device 204. Further, in some examples, multiple instances of one or more of the components 232-240 (and/or the components 114 and/or 116, or the neural network 118) may be implemented on separate devices. For example, a first instance of the inference component 116 may be implemented on the computing device(s) 102 to perform offline/backend processing, and a second instance of the inference component 116 may be implemented on the vehicle computing device 204 to perform online/local processing. In examples, the computing device(s) 102 may transfer, via the network(s) 230, a trained model (e.g., a trained model of the neural network 118) that is stored on the computing device(s) 102 to the vehicle 202.

In some instances, the map generation component 232 can include functionality to receive log file(s) and/or generate a three-dimensional (3D) map based on the data in log file(s). For example, the map generation component 232 can receive one or more of LIDAR data, image sensor data, GPS data, IMU data, Radar data, sonar data, etc. and can combine the data to generate a 3D map of the environment. With respect to LIDAR data, the map generation component 232 can receive a plurality of point clouds of data and can combine the data to represent an environment as captured by the vehicle 202. In some instances, the map generation component 232 can generate a mesh based on the sensor data included in a log file(s). Examples of techniques used to generate a mesh of an environment include, but are not limited to, marching cubes, screened Poisson surface reconstruction, Delaunay triangulation, tangent plane estimation, alpha shape algorithm, Cocone algorithm, PowerCrust algorithm, ball pivoting algorithm, surface interpolated methods, and the like. As can be understood, the map generation component 232 can generate a 3D map including a mesh, wherein the mesh includes a plurality of polygons that define the shape of objects in the environment. In some instances, the map generation component 232 can include functionality to divide portions of the mesh into tiles representing a discrete portion of the environment.

The map generation component 232 can generate a 3D mesh (or other representation, e.g., Signed Distance Function, voxel, voxel hash, parameterized surfaces, NURBS, etc.) of an environment based on sensor data captured by one or more LIDAR sensors (or other sensors), for example. In some instances, surfaces in a 3D map can be represented by one or more polygons. In some instances, objects can be represented by voxels, histograms, or distribution functions. In some instances, surfaces in a 3D map can be represented by a parameterized entity. In some instances, the map generation component 232 can associate semantic information with individual polygons of the 3D mesh.

In some instances, the map generation component 232 can generate a mesh and generate a map based on the mesh. Alternatively, or additionally, the map generation component 232 can generate a map based on voxels, histograms, point clouds, etc. In some instances, aspects of a map can be referred to as elements. Further, in some instances, surfaces and objects can be represented as parameterized objects, non-uniform rational basis spline (NURBS), and the like.

The semantic information component 234 can include functionality to receive semantic information and/or to determine semantic information based at least in part on a log file(s), and to associate the semantic information with individual polygons of the mesh of the 3D map. In some instances, the semantic information component 234 can receive the semantic information from a log file(s), whereby the semantic information was determined by individual vehicles of the vehicle 202. In some instances, the semantic information component 234 can perform segmentation and/or classification on the sensor data in the log file(s) (e.g., via one or more segmentation and/or classification algorithms, including, but not limited to machine learning algorithms, which may be trained by implementing the techniques discussed herein) to determine the semantic information at the computing device(s) 102. In some instances, the semantic information component 234 can receive first semantic information from a log file(s), can determine second semantic information based on sensor data in the log file(s), and can compare the first semantic information and the second semantic information to verify an accuracy or an agreement of the semantic information. In some cases, receiving semantic information or generating semantic information can be referred to generally as obtaining semantic information. More generally, the operation of obtaining can be said to include receiving, generating, accessing, and/or determining.

Further, in some examples, semantic information can include a semantic classification of objects represented by polygons in the 3D map. For example, the semantic information can include semantic classifications including, but not limited to, ground, wall, road, curb, sidewalk, grass, tree, tree trunk/branch, foliage (e.g., leaves), building, wall, fire hydrant, mailbox, pole, post, pedestrian, bicyclist, animal (e.g., dog), and the like. In some instances, the semantic information can provide an indication of whether the polygon, object, or element represents a static object, dynamic object, etc. In some instances, the semantic information can include an object identifier to distinguish between different instances of the same semantic classification (e.g., tree #1, tree #2, etc.). The semantic information component 234 can use classical and/or machine learning (e.g., neural network) algorithms to receive data and output one or more detections, segmentations, and/or classifications of objects associated with the data.

The log file component 236 can store log files including sensor data (raw or processed) received from one or more vehicles, such as vehicle 202. The sensor data in the log file component 236 can represent sensor data collected by one or more onboard sensor systems (e.g., such as onboard sensor system(s) 206), or other sensor system(s), at previous time(s) (e.g., previously connected sensor data). In some examples, the sensor data can be stored in association with locations, entity types, and/or other types of characteristics. Additionally, in at least one example, semantic information determined from the sensor data can be stored in the log file component 236. That is, the log file component 236 can also store semantic information associated with individual points of a point cloud or associated with individual polygons or elements.

In at least one example, the localization component 238 can include functionality to determine a location of a vehicle relative to a map based on sensor data captured of an environment. In the context of LIDAR data, the localization component 238 can utilize SLAM, CLAMS, etc., or can align a point cloud of LIDAR data with the various polygons comprised in a 3D mesh. In some example, the localization component 238 can receive sensor data from the log file component 236 and can project or otherwise use the sensor data included in individual log files to localize a vehicle against various meshes.

In at least one example, the perception component 240 can include functionality to perform segmentation and/or classification on sensor data to determine attributes about objects, surfaces, elements, polygons, etc. in an environment. By way of example, the perception component 240 can analyze sensor data included in log files of the log file component 236 to detect, segment, and determine semantic information associated with objects represented in the sensor data (e.g. classify the object as belonging to one or more classes). In at least one example, the perception component 240 can correspond to the perception component 222 operating on the vehicle 202.

The data validation component 248 can perform functionality to validate data, such as a mesh. For example, the data validation component 248 can implement any of the techniques discussed herein to analyze voxels to identify an error represented in the voxels. When an error has been identified, the data validation component 248 can perform an action. The action can include displaying a representation associated with the data and an indication of the error, storing an indication of the error in a log file, updating a trajectory for a vehicle, updating the data or a mesh associated with the data, and so on.

The processor(s) 216 of the vehicle 202 can be any suitable processor capable of executing instructions to process data and perform operations as described herein. By way of example and not limitation, the processor(s) 216 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors (or processing units) in so far as they are configured to implement encoded instructions.

The memory 218 is an example of non-transitory computer-readable media. The memory 218 can store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 2 is illustrated as a distributed system, in alternative examples, components of the vehicle 202 can be associated with the computing device(s) 102 and/or components of the computing device(s) 102 can be associated with the vehicle 202. That is, the vehicle 202 can perform one or more of the functions associated with the computing device(s) 102, and vice versa.

The computing device(s) 102 may include one or more computing devices that are implemented at the same location and/or distributed. In one example, the first processing unit 104 is implemented on a first computing device and the second processing unit 106 and memory 108 are implemented on a second computing device. In another example, the first processing unit 104, the second processing unit 106, and the memory 108 are implemented on the same computing device. In yet other examples, other configurations are used.

Figure 3:
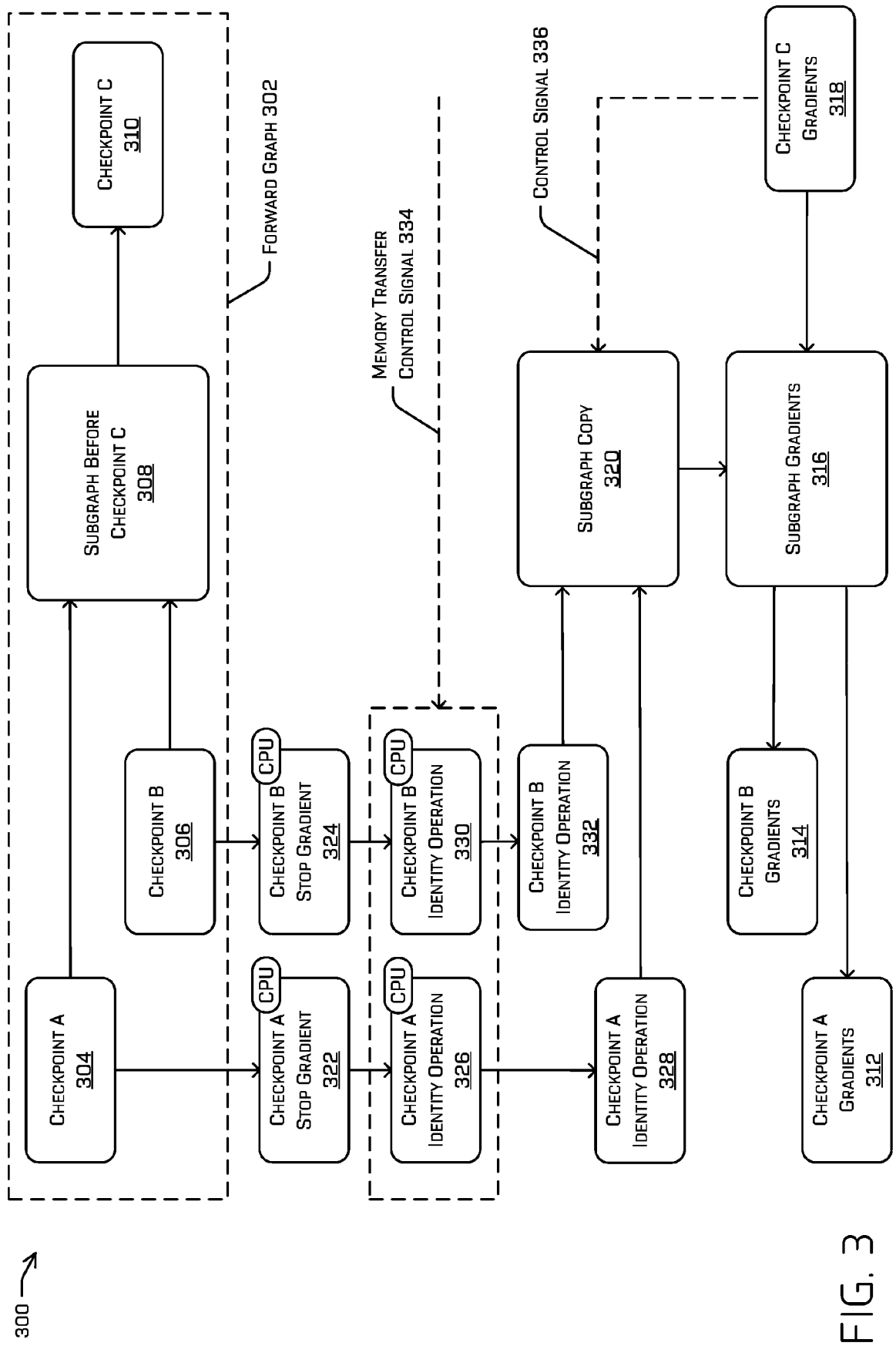
FIG. 3 illustrates an example block diagram of offloading data during training of a neural network.

FIG. 3 illustrates an example block diagram 300 of offloading data during training of a neural network. The example 300 represents one of many implementations for offloading activations. In other words, fewer or more operations (e.g., blocks) and/or a different arrangement of operations may be implemented.

For ease of discussion, the example 300 is discussed in the context of FIG. 1. For example, the first processing unit 104 (e.g., the training component 114) may implement a variety of operations to offload activations to the memory 108 associated with the second processing unit 106. In particular, the example 300 uses checkpointing to save some activations during forward propagation (e.g., so that they do not need to be recomputed during backwards propagation), and recomputes other activations during backwards propagation (e.g., activations associated with a subgraph). One or more of the activations associated with the checkpoints may be offloaded to the memory 108 associated with the second processing unit 106. As such, the first processing unit 104 may selectively offload activations. By transferring some of the activations, this may avoid overloading a memory transfer bus. Although in other examples, other activations may be offloaded, such as all activations, more or less than a threshold number of activations, etc.

The example 300 illustrates data offloading for a portion of a neural network. Here, a forward graph 302 for the portion of the neural network includes nodes from input to output with respect to forward propagation. Blocks 304, 306, and 310 each represent a single node of the forward graph 302. In particular, the nodes for the blocks 304, 306, and 310 are each associated with a checkpoint. Meanwhile, block 308 represents one or more nodes of the forward graph 302 that are between the checkpointed nodes, as discussed in further detail below. The example 300 represents training with respect to the node for block 310. Similar processing would occur for each checkpointed node in the neural network.

In this example, the blocks 304 and 306 feed into the block 308 and the block 308 feeds into the block 310. In particular, each of the blocks 304, 306, and 310 may be associated with an operation that, when executed, generates an activation (or layer of activations) that is provided to a next layer. For example, an operation may be executed at the block 304 to generate an activation (or layer of activations) that is fed into the block 308 as input, an operation may be executed at the block 306 to generate an activation that is fed into the block 308 as input, and one or more operations (corresponding to the one or more nodes of the subgraph) may be executed at the block 308 to generate one or more activations that are fed into the block 310 (e.g., a last activation in the subgraph being fed into the block 310).

In examples, the first processing unit 104 may receive the neural network (e.g., including the forward graph 302) and generate the blocks 312-318 for computing the gradients. The blocks 312-318 are used to compute gradients for the nodes associated with the blocks 304-310, respectively. For example, the block 312 may be used to compute a gradient for the block 304, the block 314 may be used to compute a gradient for the block 306, the block 316 may be used to compute a gradient(s) for the block 308, and the block 318 may be used to compute a gradient for the block 310. To do so, each of the blocks 312-318 may be associated with a gradient operation that, when executed, generates a gradient.

As illustrated, the block 304 is associated with checkpoint A, the block 306 is associated with checkpoint B, and the block 310 is associated with checkpoint C. In other words, the blocks 304, 306, and 310 have been selected for checkpointing, so that activations (or layers of activation) associated with the blocks 304, 306, and 310 may be saved for future use during backpropagation (e.g., to avoid recomputing the activations during backpropagation).

The first processing unit 104 may determine the subgraph associated with the block 308 based on the checkpoints A, B, and C. For example, the first processing unit 104 may sort checkpoints in the neural network topologically into layers, such that checkpoints in a given layer depend on those from previous layers. The first processing unit 104 may then iterate backwards through the layers (e.g., from the output end to the input end). When considering layer i, for example, the first processing unit 104 may identify the operation with respect to layer i. The training component 144 may search backwards from layer i until another checkpoint is found to determine operations that feed into layer i. This may identify a subset of the forward graph, which outputs to checkpoint layer i, and takes input from one or more earlier checkpoint layers. In the example 300, this may include searching backwards from the block 310 to identify the subgraph associated with the block 308. In particular, the subgraph represents one or more nodes looking backwards through the neural network from the block 310 to the block 304 (associated with checkpoint A) and to the block 306 (associated with checkpoint B). Here, the checkpoint A may be referred to as having a connection to the checkpoint C and the checkpoint B may be referred to as having a connection to the checkpoint C. As such, the subgraph is the network of all intermediary connections from the checkpoint C back through to the checkpoint A and the checkpoint B. The first processing unit 104 may generate a copy of the subgraph associated with the block 308 and associate the subgraph copy with a block 320.

In addition, for each node that is associated with a checkpoint, the first processing unit 104 may create a stop gradient operation for the second processing unit 106. For example, a stop gradient block 322 may be created and connected to the block 304 for the checkpoint A. The stop gradient block 322 may be associated with the second processing unit 106 (e.g., executed by the second processing unit 106 during runtime) (labeled with "CPU" in this example) to stop the second processing unit 106 from computing a gradient for the block 304 (e.g., in backwards propagation). Further, a stop gradient block 324 may be created and connected to the block 306 for the checkpoint B to stop the second processing unit 106 from computing a gradient for the block 306. A stop gradient operation (or block) may act as an identity operation for forward propagation, indicate that such activations (or activation layers) should be copied to a particular memory (of a first or second processing unit), and act to stop a gradient computation for backwards propagation. An identity operation may receive a value as input and provide the value as output without changing the value. As such, when a stop gradient operation is executed by the second processing unit 106, a gradient will not be computed at that time (although it may be computed later on, as discussed below).

Further, for each node that is associated with a checkpoint, the first processing unit 104 may apply an identity operation to the second processing unit 106 and an identity operation to the first processing unit 104. For example, an identity operation block 326 may be connected to the block 322 for the checkpoint A. As illustrated, the identity operation block 326 may be associated with the second processing unit 106 (e.g., executed by the second processing unit 106 during runtime) (labeled with "CPU" in this example). Further, an identity operation block 328 may be connected to the block 326 for the checkpoint A. The identity operation block 328 may be associated with the first processing unit 104. Similarly, an identity operation block 330 may be connected to the block 324 for the checkpoint B. The identity operation block 330 may be associated with the second processing unit 106. Further, an identity operation block 332 may be connected to the block 330 for the checkpoint B. The identity operation block 330 may be associated with the first processing unit 104. As illustrated, the identity operation block 328 and the identity operation block 332 feed into the block 320 associated with the subgraph copy. In examples, the identity operation blocks 326-332 may be used to transfer an activation to memory and/or a processing unit (e.g., to pin a tensor to memory and/or a processing unit).

As discussed in further detail below, the first processing unit 104 may use a memory transfer control signal 334 to control timing for transferring the activation associated with the block 304 (checkpoint A) and the activation associated with the block 306 (checkpoint B) from the memory 108 associated with the second processing unit 106 back to the memory 112 associated with the first processing unit 104. Further, the first processing unit 104 may use a control signal 336 to control timing for executing the block 320 (e.g., re-computation of the activation(s) for the subgraph).

In one illustration, the first processing unit 104 may train the neural network by executing the blocks of the example 300. In particular, the first processing unit 104 may begin by processing the forward graph 302 (e.g., forward propagation). To do so, the first processing unit 104 may execute the block 304 (e.g., the operation associated with the block 304) to generate an activation for checkpoint A. The first processing unit 104 may store the activation for the checkpoint A into the memory 112 associated with the first processing unit 104. The first processing unit 104 may also provide the activation for the checkpoint A to the block 308. Further, the first processing unit 104 may execute the block 306 to generate an activation for checkpoint B. The first processing unit 104 may store the activation for the checkpoint B in the memory 112 associated with the first processing unit 104. The first processing unit 104 may also provide the activation for checkpoint B to the block 308.

The first processing unit 104 may execute the block 308 to generate an activation at each node (or layer) in the subgraph, store the activation into the memory 112, and pass the activation to the next node (or next layer) in the subgraph. The last activation in the subgraph may be provided to the block 310. After an activation for a node (or activations for a layer of nodes) in the subgraph is passed to a next node in the subgraph, a portion of the memory 112 that is used to store the activation may be deallocated, so that the first processing unit 104 may use the portion of the memory 112 for other data (e.g., other activations). The first processing unit 104 may also execute the block 310 to generate an activation for the checkpoint C.

Further, during the forward propagation, the first processing unit 104 may execute the block 322 to transfer the activation for the checkpoint A to the memory 108 associated with the second processing unit 106 and/or execute the block 324 to transfer the activation for the checkpoint B to the memory 108 with the second processing unit 106. In particular, since the stop gradient block 322 is associated with the second processing unit 106, and the memory 108 is associated with the second processing unit 106, the first processing unit 104 may cause the activation for the checkpoint A to be sent to the memory 108, so that the second processing unit 106 may execute a stop gradient operation for the block 322. As noted above, the stop gradient operation at the block 322 may act as an identity operation to forward the activation for the checkpoint A onto the block 326 during forward propagation and act to stop a gradient computation for the activation for the checkpoint A during backwards propagation. In examples, data transfer from/to memory may occur in parallel with main processing on the first processing unit 104 and/or the second processing unit 106 (e.g., data transfer may occur in the background on a separate stream than the main processing). As such, the activation for the checkpoint A may be transferred to the memory 108 while the rest of the forward graph 302 is processed (e.g., the block 322 may be executed while the block 306, the block 308, and/or the block 310 are executed). Similarly, the block 324 may be executed to facilitate transfer of the activation for the checkpoint B to the memory 108 associated with the second processing unit 106.

After the activation for the checkpoint A is transferred from the memory 112 to the memory 108 at the block 322, a portion of the memory 112 used to store the activation for the checkpoint A may be deallocated. Further, after the activation for the checkpoint B is transferred from the memory 112 to the memory 108 at the block 324, a portion of the memory 112 used to store the activation for the checkpoint B may be deallocated. Such deallocating may free-up the memory 112, so that the first processing unit 104 may have additional space for storing other data, such as other activations generated during the forward propagation.

The activation for the checkpoint A and/or the activation for the checkpoint B may be maintained on the memory 108 until needed during backwards propagation. In the example 300, the backwards propagation may begin after the activation for the checkpoint C is computed.

During the backwards propagation, the first processing unit 104 may compute one or more gradients. To do so, the first processing unit 104 may return the activation for the checkpoint A and the activation for the checkpoint B back to the memory 112 to recompute activations at the block 320. The first processing unit 104 may control timing for transferring the activation for the checkpoint A and/or the activation for the checkpoint B back to the memory 112 with the memory transfer control signal 334. In particular, the first processing unit 104 may send the memory transfer control transfer signal 334 to the second processing unit 106 when an event occurs. The event may include initiating execution of the block 318, ending execution of the block 318, determining that the block 320 is about to be executed (e.g., in less than a number of operations), etc. In one example, the first processing unit 104 sends the memory control transfer signal 334 after the first processing unit 104 executes the block 318 (e.g., after the gradient for the block 318 is computed). In some examples, the first processing unit 104 sends the memory control transfer signal 334 based on a gradient computation at a layer farther forward in the forwards graph 302 than the layer associated with checkpoint C, as discussed below in reference to FIG. 4.

When the memory transfer control signal 334 is received at the second processing unit 106, the second processing unit 106 may execute the block 326 and/or the block 330. Since the block 326 and the block 330 are each associated with an identity operation, the block 326 and the block 330 may act as a pass-through operation to forward on an activation to the block 328 and the block 332, respectively. For example, execution of the block 326 may cause the activation for the checkpoint A to be output to the block 328. As noted above, the block 328 is associated with the first processing unit 104 (e.g., designated to be executed by the first processing unit 104). As such, passing the activation for the checkpoint A to the block 328 causes the activation for the checkpoint A to be transferred back to the memory 112, so that the first processing unit 104 may execute the block 328. As also noted above, the block 328 is associated with an identity operation, and thus, execution of the block 328 forwards the activation for the checkpoint A to the block 320. Similarly, execution of the block 330 may cause the activation for the checkpoint B to be output to the block 332, which initiates the transfer of the activation for the checkpoint B back to the memory 112, due to the block 332 being associated with the first processing unit 104. The block 332 may forward on the activation for the checkpoint B to the block 320.

As noted above, the first processing unit 104 may recompute one or more activations for the subgraph at the block 320. For example, the first processing unit 104 may use as input to the block 320, the activation for the checkpoint A provided by the block 328 and the activation for the checkpoint B provided by the block 332. While executing the block 320, the first processing unit 104 may generate an activation at each node in the subgraph, store the activation into the memory 112, and pass the activation to the next node in the subgraph (e.g., the next layer). The last activation in the subgraph may be provided to the block 316.

To delay execution of the block 320 to a time when an activation(s) for the subgraph is needed, the first processing unit 104 may use the control signal 336. For example, the first processing unit 104 may send the control signal 336 to cause the block 320 to execute. The control signal 336 may be sent when an event occurs. The event may include initiating execution of the block 318, ending execution of the block 318, etc. In one example, the first processing unit 104 sends the control signal 336 after the first processing unit 104 executes the block 318 (e.g., after the gradient for the block 318 is computed).

As illustrated, during the backwards propagation, the first processing unit 104 may execute a gradient operation for the block 318 to generate a gradient for the block 310. The gradient may be provided to the block 316. The first processing unit 104 may execute one or more gradient operations at the block 316 to generate one or more gradients for the subgraph. For example, the first processing unit 104 may generate a gradient for each node in the gradient subgraph, store the gradient into the memory 112, and pass the gradient to the next node in the gradient subgraph (e.g., the next layer in a backwards direction). A last gradient in the gradient subgraph may be passed onto the block 314 and/or the block 312. The first processing unit 104 may execute a gradient operation at the block 314 to generate a gradient for the block 306. Further, the first processing unit 104 may execute a gradient operation at the block 312 to generate a gradient for the block 304. As such, the gradients for the neural network may be computed during backwards propagation.

As noted above, the blocks 322-332 are associated with different devices in order to control transfer of activations between memory. In the example 300, the blocks 322, 324, 326, and 330 are designated to be executed by the second processing unit 106, while the blocks 328 and 332 are designated to be executed by the first processing unit 104. In examples, as soon as a block begins execution, memory may be allocated to execute the operation. As such, the memory transfer control signal 334 may be used with the block 326 and/or the block 330 to control the timing (e.g., delay) for when the activation for the checkpoint A and/or the activation for the checkpoint B is transferred back to the memory 112.

Figure 4A:
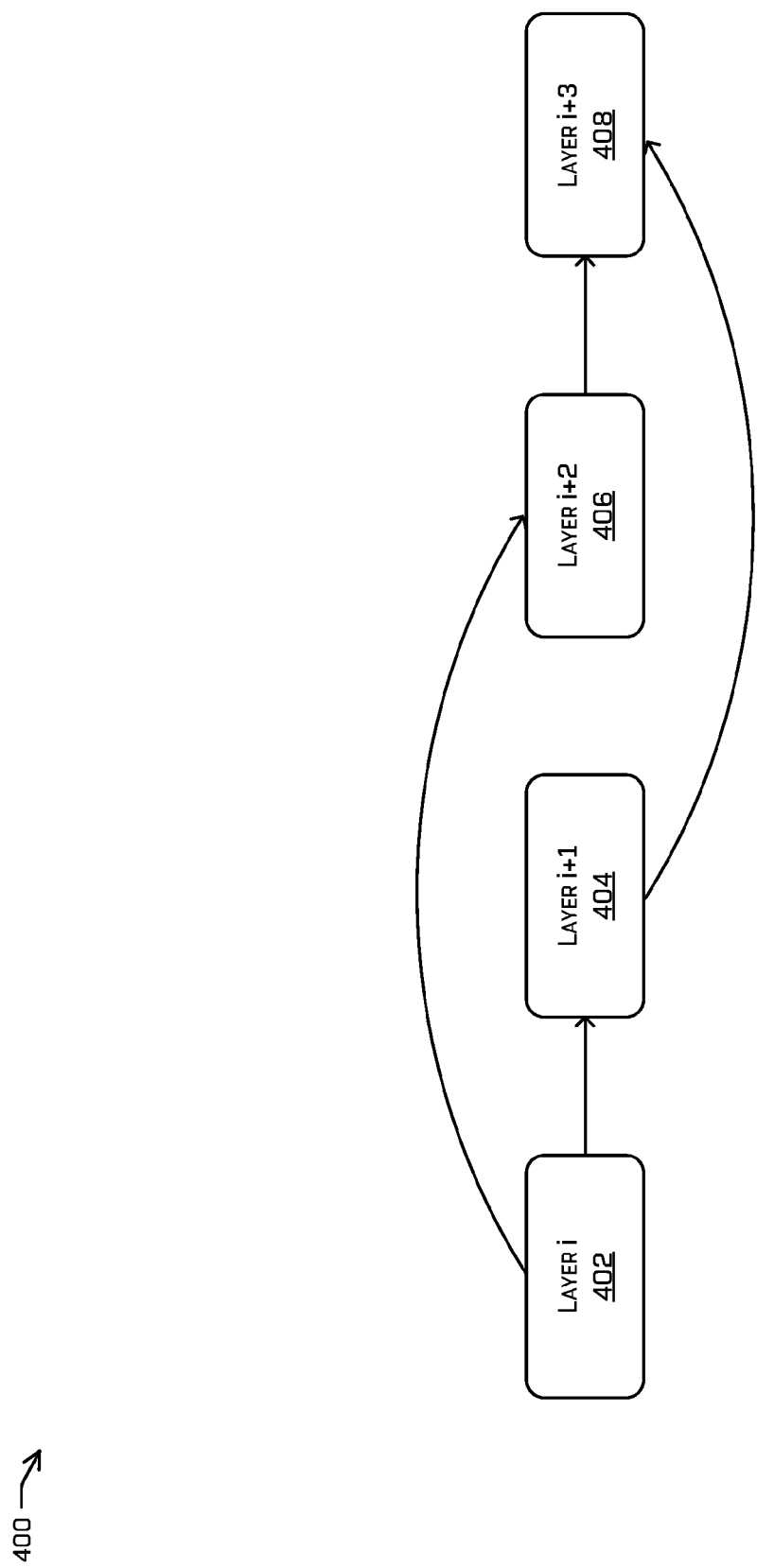
FIGS. 4A-4B illustrates example diagrams of layers and connections between layers of a neural network.
Figure 4B:
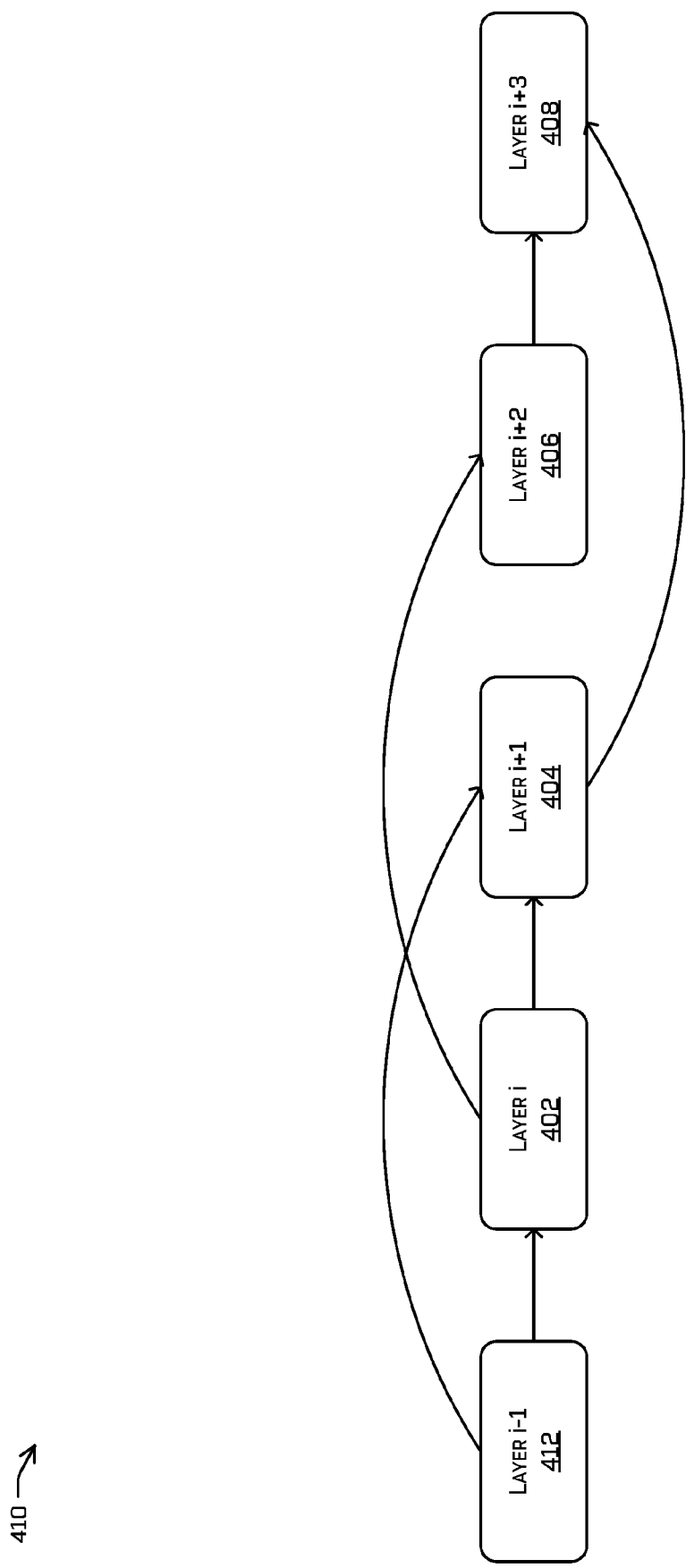

FIG. 4A illustrates an example diagram 400 of layers and connections between layers of a neural network (e.g., in a forward graph). The example 400 includes layer i illustrated with block 402, layer i+1 illustrated with block 404, layer i+2 illustrated with block 406, and layer i+3 illustrated with block 408. Here, the example 400 represents a non-linear neural network (e.g., layers being connected in a non-linear order). As illustrated, the layer i feeds into the layer i+1 and the layer i+2, the layer i+1 feeds into the layer i+3, and the layer i+2 feeds into the layer i+3. If a layer feeds into another layer, the layer may be referred to as having a connection to the other layer. A connection may refer to a direct connection between layers. For example, layer i has a connection to layer i+2.

To illustrate data offloading for the example 400, the example 400 will be discussed in the context of FIG. 1. For example, the first processing unit 104 may train the neural network associated with example 400 by computing activations during forward propagation for the various layers of the neural network (e.g., layer i through layer i +3). The first processing unit 104 may cause activations that are associated with checkpoints to be stored on the memory 108 associated with the second processing unit 106.

During backwards propagation, an activation for a given layer may be returned to the memory 112 associated with the first processing unit 104 based on a connection of the given layer to previous layer in the neural network. For example, to determine a time to return an activation for a first layer to the memory 112 (e.g., a latest possible time to avoid waiting on restoring the activation to the memory 112), the first processing unit 104 may determine a second layer that feeds into the first layer in the forward graph of the neural network. Activations for the second layer should be restored to the memory 112 before computing gradients back from the first layer.

In one example of many implementations, the following techniques may be used to determine timing for restoring data to a primary processing unit (e.g., a processing unit that is training a neural network). In this example, let d(ij) be true if there is a direct connection from layer i to layer j in a forward computation graph (and $i \neq j$), and false otherwise. Here, layers may be indexed by a topological order for a forwards direction, so d(ij) is trivially false for any $j \geq i$. In this example, a control dependency (e.g., control signal) may be used on a subgraph of the neural network stemming backwards from layer i to wait on gradients of that layer. In other words, the control dependency may delay re-computation of tensors (e.g., activations) necessary to continue backpropagating from layer i until the gradient for the layer i is computed.

In continuing with this example, for a given checkpoint layer i, a smallest $j > i$ possible may be chosen to wait on (e.g., do not restore layer i until gradients for layer j are computed). The smallest such value (which corresponds to a latest possible stage in the backwards propagation) may be referred to as $ĵ = \max \{j : d(i,j) = \text{True}\}$. In other words, layer i may be loaded before computing the gradients back from any layer j with a connection from i to j, and, in some examples, based on the furthest such connection. To illustrate in the context of FIG. 4A, during backwards propagation, layer i should be returned to the memory 112 before computing gradients back from layer i+2, since layer i feeds into layer i +2 in the forward graph. In one example, activations for layer i are returned to the memory 112 right after gradients for layer i+2 are computed. As another illustration in the context of FIG. 4A, during backwards propagation, layer i +1 (and layer i+2) should be returned to the memory 112 before computing gradients back from layer i+3, since layer i+1 (and layer i+2) feed into layer i+3 in the forward graph.

In some instances, a tighter control dependency may be used for layer i, instead of just waiting on $ĵ = \max \{j : d(i,j) = \text{True}\}$. Here, a control dependency may be added on all layers $j \geq ĵ$ (or a threshold number). In some examples, such a tighter control would require first performing associated operations on nodes further in the forward graph than the maximum connection to layer i. In referring to FIG. 4A, this would have layer i wait on layers {i+2, i+3}, and layer i +1 wait on layer {i+3}.

To further illustrate such tighter control dependency, assume that the example 400 includes an additional layer, layer i-1. This example is illustrated as example diagram 410 in FIG. 4B with layer i-1 being represented with block 412. As shown, layer i-1 feeds into layer i and layer i+1 in the forward graph. Here, a farthest layer forward in the forward graph that is connected to layer i-1 is layer i+1 (e.g., layer i+1 corresponds to the ĵ for layer i-1). To implement the tighter control dependency, the activations for layer i-1 would be loaded back into the memory 112 after the gradients for layers {i+3, i+2, i+1} are computed (e.g., all the layers at or after ĵ).

Figure 5A:
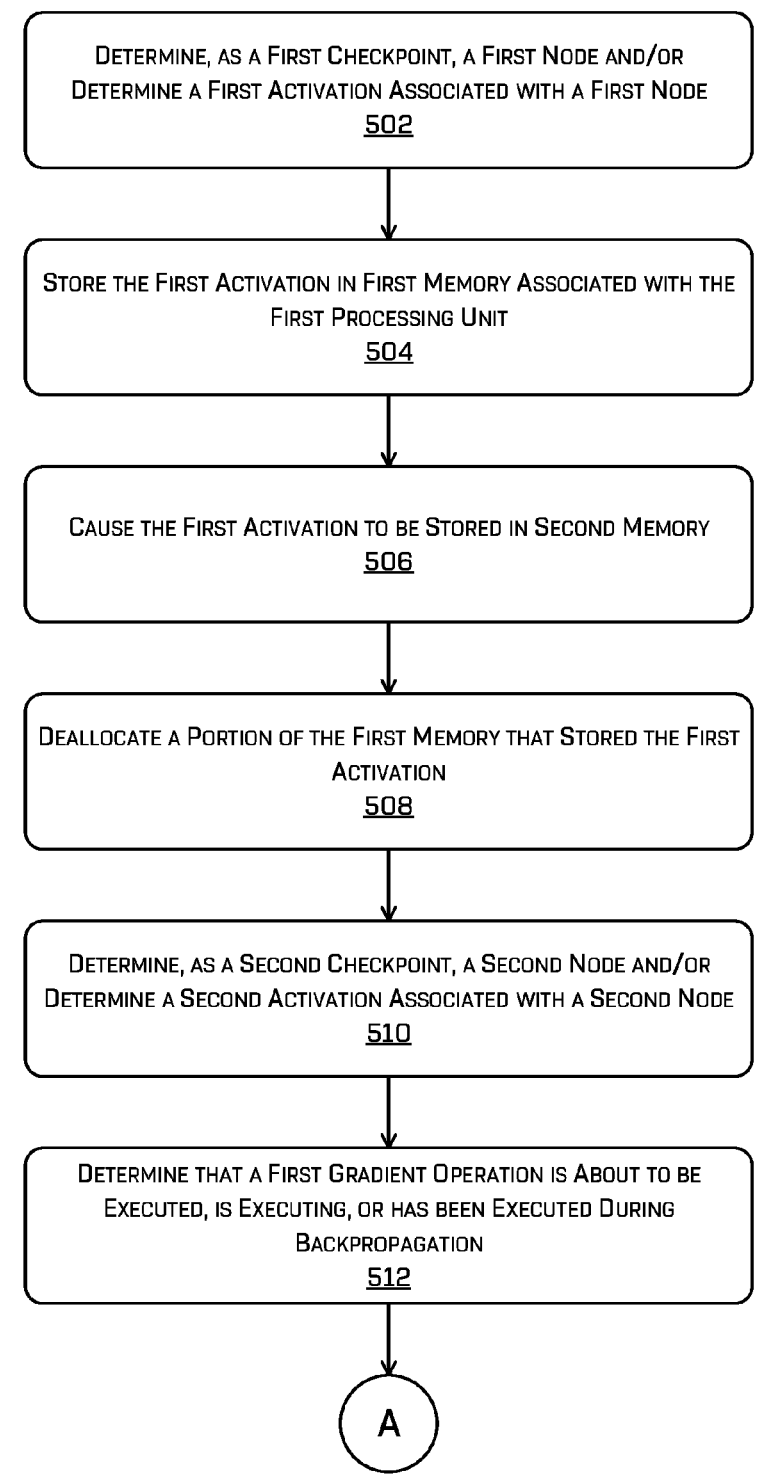
FIGS. 5A-5B illustrate an example process to offload data while training an artificial neural network.
Figure 5B:
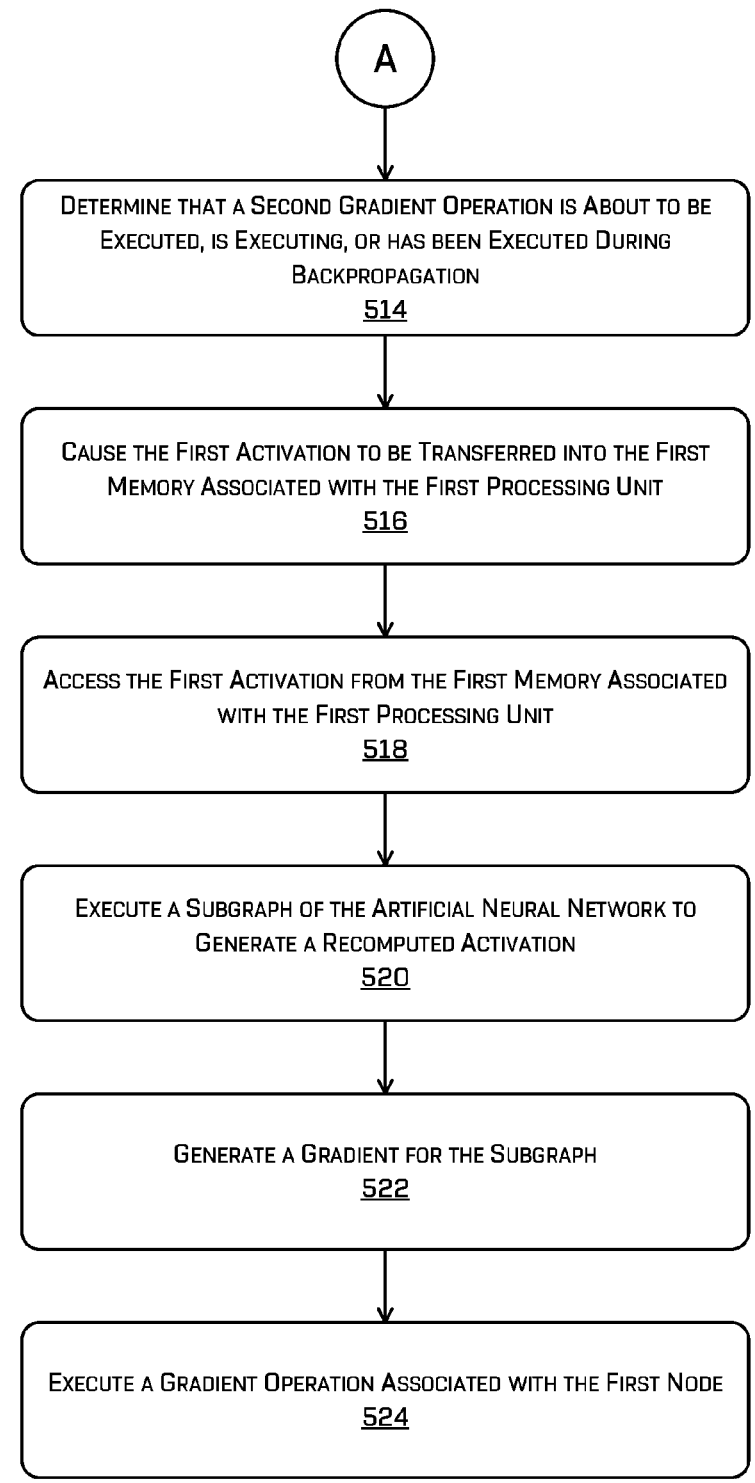

FIGS. 5A-5B illustrate an example process 500 to offload data while training an artificial neural network. This process 500 is illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. The process 500 can be performed by any component, such as the first processing unit 104 of FIG. 1, the second processing unit 106 of FIG. 1, the vehicle computing device 204 of FIG. 2, another processing unit or computing device, etc. For ease of discussion, the process 500 will be discussed in the context of FIG. 1 (and FIG. 3, in some cases). In examples, the process 500 is associated with a training stage for an artificial neural network.

In FIG. 5A, at 502, the first processing unit 104 may determine, as a first checkpoint, a first node and/or determine a first activation associated with a first node (and/or activations associated with a first layer). For example, the first processing unit 104 may execute, during forward propagation, a first operation associated with the first node to generate a first activation. The first node may be part of a forward graph for an artificial neural network. The forward propagation may include executing the forward graph node-by-node. In some examples, the first node is a first checkpoint. The first node may have been checkpointed by a user, system, application, etc. As noted above, the first processing unit 104 may comprise a GPU, CPU, tensor processing unit, neural processing unit, digital signal processor, etc. In one example in the context of FIG. 3, at 502, the first processing unit 104 may execute the block 304 or the block 306.

At 504, the first processing unit 104 may store the first activation in first memory associated with the first processing unit 104, such as a portion of the memory 112. In examples, the operation 504 is performed based on or in response to performing the operation 502.

At 506, the first processing unit 104 may cause the first activation to be stored in second memory. For example, the first processing unit 104 may copy the first activation (or first later of activations) from the first memory into the second memory (e.g., send the first activation (or first layer of activations) to the second memory for storage). The second memory may be external to the first processing unit 104, such as the memory 108 associated with the second processing unit 106, memory at a remote location (e.g., cloud storage), or any other memory. As noted above, the second processing unit 106 may comprise a GPU, CPU, tensor processing unit, neural processing unit, digital signal processor, etc.

At 508, the first processing unit 104 may deallocate a portion of the first memory that stored the first activation, such as a portion of the memory 112. Such deallocation may make the portion of the first memory available for storage of other data. In examples, the operation 508 is performed based on or in response to performing the operation 506.

At 510, the first processing unit 104 may determine, as a second checkpoint, a second node and/or determine a second activation associated with a second node (or second activations associated with a second layer). For example, the first processing unit 104 may execute, during the forward propagation, a second operation associated with a second node to generate a second activation (or second layer). The second node may be part of the forward graph of the artificial neural network, such as a node of a subgraph, a second checkpoint, etc. The first processing unit 104 may execute any number of operations associated with the forward graph at the operation 510. In some examples, the second operation may be executed using the deallocated portion of the first memory and/or while the first activation is being transferred to the second memory at the operation 506. In one example in the context of FIG. 3, at 510, the first processing unit 104 may execute the block 308 or the block 310.

At 512, the first processing unit 104 may determine that a first gradient operation is about to be executed, is executing, or has been executed during backpropagation. In examples, the first node (or layer) is connected to the second node (or layer) through one or more nodes of a subgraph. The second node (or layer) may be farther forward in a forward graph than the first node (or layer). In examples where the first node (or layer) is a first checkpoint and the second node (or layer) is a second checkpoint, a direct path (also referred to as connection or direct connection) exists between the first node (or layer) and the second node (or layer) along one or more nodes without passing through another checkpoint. Here, the first gradient operation may be associated with the second node (or layer). In other words, the first gradient operation may be executed to generate a gradient for the second node (or layer). In some examples, determining that the first gradient operation is about to be executed comprises determining that the first gradient operation will be executed in less than a threshold number of operations (e.g., the first gradient operation is queued for processing).

In one example in the context of FIG. 3, at 512, the first processing unit 104 may determine that the block 318 has been executed. As illustrated in FIG. 3, the block 310 (checkpoint C) is located farther forward in the forward graph 302 than the block 304 (checkpoint A) and the block 306 (checkpoint B), for example.

In FIG. 5B, at 514, the first processing unit 104 may determine that a second gradient operation is about to be executed, is executing, or has been executed during backpropagation. In examples, the second gradient operation is associated with a third node (or layer) that is farther forward in a forward graph than the second node (or layer). The third node (or layer) may be connected to the second node (or layer) through one or more nodes. In examples, the third node (or layer) is a third checkpoint. In other examples, the third node (or layer) is not checkpointed.

At 516, the first processing unit 104 may cause the first activation (or activations in the first layer) to be transferred into the first memory associated with the first processing unit. For example, the first processing unit 104 may send a control signal to the second memory and/or the second processing unit 106 to cause the first activation (or activations in the first layer) to be transferred back to the first processing unit 104 and/or the first memory associated with the first processing unit 104 (e.g., load the first activation back into the memory 112). Based on the control signal, the first processing unit 104 may receive the first activation from the second memory and/or the second processing unit 106 and store the first activation in the first memory. In examples, the operation 516 is performed based on or in response to the determination at the operation 512 and/or the determination at the operation 514.

At 518, the first processing unit 104 may access the first activation from the first memory associated with the first processing unit 104. The first activation may be accessed during backwards propagation for the artificial neural network.

At 520, the first processing unit 104 may execute a subgraph of the artificial neural network during backwards propagation for the artificial neural network to generate a recomputed activation. The subgraph may be nodes located between the first checkpoint and the second checkpoint. In examples, the operation 520 is performed based on the determination at the operation 512, the determination at the operation 514, and/or the accessing at the operation 518. In one example in the context of FIG. 3, at 520, the first processing unit 104 may execute the block 320.

At 522, the first processing unit 104 may generate a gradient for the subgraph. In examples, the operation 522 may be based on the recomputed activation generated at the operation 520. In one example in the context of FIG. 3, at 522, the first processing unit 104 may execute the block 316.

At 524, the first processing unit 104 may execute a gradient operation associated with the first node. In examples, the operation 524 is based on the gradient generated at the operation 522. In one example in the context of FIG. 3, at 524, the first processing unit 104 may execute the block 312 or the block 314.

EXAMPLE CLAUSES

While the example clauses described above are described with respect to one particular implementation, it should be understood that, in the context of this document, the content of the example clauses can also be implemented via a method, device, system, and/or computer-readable medium.

A. An example method of training an artificial neural network comprises: determining, as a checkpoint, a first node in the artificial neural network, the first node associated with a first operation; executing, by a Graphics Processing Unit (GPU), the first operation during forward propagation for the artificial neural network to generate a first activation; storing the first activation in a portion of first memory associated with the GPU; copying the first activation from the portion of the first memory to second memory that is associated with a Central Processing Unit (CPU); deallocating the portion of the first memory associated with the GPU; sending, by the GPU, a control signal to the CPU to cause transfer of the first activation back to the GPU; receiving, based at least in part on the control signal, the first activation into the first memory associated with the GPU to perform a backpropagation for the artificial neural network; and accessing the first activation from the first memory during the backpropagation for the artificial neural network.

B. The method of example A, further comprising: executing, by the GPU, a second operation during the forward propagation for the artificial neural network to generate a second activation, the second operation associated with a second node in the artificial neural network, the second node being another checkpoint that is connected to the checkpoint through one or more nodes of a subgraph; and determining that the GPU has executed a gradient operation during the backpropagation for the artificial neural network, the gradient operation associated with the second node, wherein the sending the control signal is based at least in part on the determining that the GPU has executed the gradient operation.

C. The method of example A or B, further comprising: determining that the GPU has executed another gradient operation during the backpropagation for the artificial neural network, the other gradient operation associated with a third node in the artificial neural network that is farther forward in a forward graph for the artificial neural network than the second node, wherein the sending the control signal is based at least in part on the determining that the GPU has executed the other gradient operation.

D. The method of any of examples A through C, further comprising: determining, as another checkpoint, a second node in the artificial neural network, the other checkpoint being connected to the checkpoint through one or more nodes of a subgraph of the artificial neural network; determining that the GPU has executed a first gradient operation during the backpropagation for the artificial neural network, the first gradient operation associated with the second node; based at least in part on the determining that the GPU has executed the first gradient operation and the accessing the first activation from the first memory, executing the subgraph of the artificial neural network during the backpropagation for the artificial neural network to generate a recomputed activation; based at least in part on the recomputed activation, generating a gradient for the subgraph; and based at least in part on the gradient, executing, by the GPU, a second gradient operation during the backpropagation for the artificial neural network, the second gradient associated with the first node.

E. The method of any of examples A through D, wherein the first activation is copied to the second memory that is associated with the CPU while at least a portion of the subgraph is executed.

F. One or more example non-transitory computer-readable media store instructions that, when executed, cause one or more processors of a first processing unit to perform acts comprising: determining, during a forward propagation associated with an artificial neural network, an activation associated with a first node in the artificial neural network; causing the activation to be stored in memory associated with a second processing unit; sending, during a backpropagation, a control signal; receiving, based at least in part on the control signal, the activation into memory associated with the first processing unit; and determining, during a backpropagation and based at least in part on the activation, a gradient.

G. The one or more non-transitory computer-readable media of example F, wherein the first processing unit comprises a Graphics Processing Unit (GPU) and the second processing unit comprises a Central Processing Unit (CPU).

H. The one or more non-transitory computer-readable media of example F or G, wherein a second node of the artificial neural network is connected to the first node through one or more nodes of a subgraph, and the second node is farther forward in a forward graph for the artificial neural network than the first node, and the acts further comprising: determining that a gradient operation has been executed during the backpropagation, the gradient operation associated with the second node; and wherein the sending the control signal is based at least in part on the determining that the gradient operation has been executed.

I. The one or more non-transitory computer-readable media of any of examples F through H, wherein the acts further comprise: determining that another gradient operation has been executed during the backpropagation, the other gradient operation associated with a third node in the artificial neural network that is farther forward in the forward graph for the artificial neural network than the second node, wherein the sending the control signal is based at least in part on the determining that the other gradient operation has been executed.

J. The one or more non-transitory computer-readable media of any of examples F through I, wherein a second node of the artificial neural network is connected to the first node through one or more nodes of a subgraph, and the second node is farther forward in a forward graph for the artificial neural network than the first node, and the acts further comprising: determining that a first gradient operation has been executed during the backpropagation, the first gradient operation associated with the second node; based at least in part on the activation and the determining that the first gradient operation has been executed, executing the subgraph of the artificial neural network during the backpropagation to generate a recomputed activation; and based at least in part on the recomputed activation, generating another gradient for the subgraph, wherein the determining the gradient comprises, based at least in part on the other gradient for the subgraph, executing a second gradient operation during the backpropagation to determine the gradient, the gradient associated with the first node.

K. The one or more non-transitory computer-readable media of any of examples F through J, wherein the activation is stored into the memory that is associated with the second processing unit while at least a portion of the subgraph is executed.

L. The one or more non-transitory computer-readable media of any of examples F through K, wherein the acts further comprise: storing, during the forward propagation, the activation in a portion of the memory associated with the first processing unit; and deallocating the portion of the memory associated with the first processing unit upon the causing the activation to be stored in the memory associated with the second processing unit.

M. An example first processing unit comprises: one or more processors; and one or more computer-readable media storing instructions executable by the one or more processors, wherein the instructions, when executed, cause the first processing unit to perform acts comprising: determining, during a forward propagation of a training stage for an artificial neural network, an activation; copying the activation from a first memory accessible to the first processing unit to second memory that is external to the first processing unit; sending a control signal; copying, based at least in part on the control signal, the activation from the second memory to the first memory; and determining, during a backpropagation associated with the training stage and based at least in part on the activation, a gradient.

N. The first processing unit of example M, wherein the first processing unit comprises a Graphics Processing Unit (GPU).

O. The first processing unit of example M or N, wherein the second memory is associated with a Central Processing Unit (CPU).

P. The first processing unit of any of examples M through O, wherein the activation is associated with a first node in the artificial neural network that is connected to a second node in the artificial neural network through one or more nodes of a subgraph, and the second node is farther forward in a forward graph for the artificial neural network than the first node, and the acts further comprising: determining that a gradient operation has been executed during the backpropagation, the gradient operation being associated with the second node, wherein the sending the control signal is based at least in part on the determining that the gradient operation has been executed.

Q. The first processing unit of any of examples M through P, wherein the acts further comprise: determining that another gradient operation has been executed during the backpropagation, the other gradient operation being associated with a third node that is located farther forward in the forward graph for the artificial neural network than the second node, wherein the sending the control signal is based at least in part on the determining that the other gradient operation has been executed.

R. The first processing unit of any of examples M through Q, wherein the activation is associated with a first node in the artificial neural network that is connected to a second node in the artificial neural network through one or more nodes of a subgraph, and the second node is farther forward in a forward graph for the artificial neural network than the first node, the acts further comprising: determining that a first gradient operation has been executed during the backpropagation, the first gradient operation being associated with the second node; based at least in part on the activation and the determining that the gradient operation has been executed, executing a subgraph of the artificial neural network during the backpropagation to generate a recomputed activation; and based at least in part on the recomputed activation, generating another gradient for the subgraph, wherein the determining the gradient comprise, based at least in part on the other gradient, executing a second gradient operation during the backpropagation to determine the gradient, the gradient being associated with the first node.

S. The first processing unit of any of examples M through R, wherein the activation is copied to the second memory while at least a portion of the subgraph is executed.

T. The first processing unit of any of examples M through S, wherein the acts further comprise: storing the activation in a portion of the first memory; and deallocating the portion of the first memory upon the copying the activation to the second memory.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A method of training an artificial neural network comprising:
    executing, by a Graphics Processing Unit (GPU), a first operation during forward propagation for the artificial neural network to generate a first activation;
    determining a checkpoint designating a subset of the artificial neural network, the checkpoint comprising the first activation associated with a first node in the artificial neural network;
    storing the first activation in a portion of first memory associated with the GPU;
    copying, based at least in part on the checkpoint, the first activation from the portion of the first memory to second memory that is associated with a Central Processing Unit (CPU);
    deallocating the portion of the first memory associated with the GPU;
    sending, based at least in part on the checkpoint and by the GPU, a control signal to the CPU to cause transfer of the first activation back to the GPU;
    receiving, based at least in part on the control signal, the first activation into the first memory associated with the GPU to perform a backpropagation for the artificial neural network; and
    accessing the first activation from the first memory during the backpropagation for the artificial neural network.

2. The method of claim 1, further comprising:
    executing, by the GPU, a second operation during the forward propagation for the artificial neural network to generate a second activation, the second operation associated with a second node in the artificial neural network, the second node being another checkpoint that is connected to the checkpoint through one or more nodes of a subgraph; and
    determining that the GPU has executed a gradient operation during the backpropagation for the artificial neural network, the gradient operation associated with the second node,
    wherein the sending the control signal is based at least in part on the determining that the GPU has executed the gradient operation.

3. The method of claim 2, further comprising:
    determining that the GPU has executed another gradient operation during the backpropagation for the artificial neural network, the other gradient operation associated with a third node in the artificial neural network that is farther forward in a forward graph for the artificial neural network than the second node,
    wherein the sending the control signal is based at least in part on the determining that the GPU has executed the other gradient operation.

4. The method of claim 1, further comprising:
    determining, as another checkpoint, a second node in the artificial neural network, the other checkpoint being connected to the checkpoint through one or more nodes of a subgraph of the artificial neural network;

determining that the GPU has executed a first gradient operation during the backpropagation for the artificial neural network, the first gradient operation associated with the second node;

based at least in part on the determining that the GPU has executed the first gradient operation and the accessing the first activation from the first memory, executing the subgraph of the artificial neural network during the backpropagation for the artificial neural network to generate a recomputed activation;

based at least in part on the recomputed activation, generating a gradient for the subgraph; and based at least in part on the gradient, executing, by the GPU, a second gradient operation during the backpropagation for the artificial neural network, a second gradient associated with the first node.

5. The method of claim 4, wherein the first activation is copied to the second memory that is associated with the CPU while at least a portion of the subgraph is executed.

6. One or more non-transitory computer-readable media storing instructions that, when executed, cause one or more processors of a first processing unit to perform acts comprising:

determining, during a forward propagation associated with an artificial neural network, a checkpoint designating a subset of the artificial neural network, the checkpoint comprising an activation associated with a first node in the artificial neural network;

causing, based at least in part on the checkpoint, the activation to be stored in memory associated with a second processing unit;

sending, based at least in part on the checkpoint and during a backpropagation, a control signal;

receiving, based at least in part on the control signal, the activation into memory associated with the first processing unit; and determining, during a backpropagation and based at least in part on the activation, a gradient.

7. The one or more non-transitory computer-readable media of claim 6, wherein the first processing unit comprises a Graphics Processing Unit (GPU) and the second processing unit comprises a Central Processing Unit (CPU).

8. The one or more non-transitory computer-readable media of claim 6, wherein a second node of the artificial neural network is connected to the first node through one or more nodes of a subgraph, and the second node is farther forward in a forward graph for the artificial neural network than the first node, and the acts further comprising:

determining that a gradient operation has been executed during the backpropagation, the gradient operation associated with the second node; and wherein the sending the control signal is based at least in part on the determining that the gradient operation has been executed.

9. The one or more non-transitory computer-readable media of claim 8, wherein the acts further comprise:

determining that another gradient operation has been executed during the backpropagation, the other gradient operation associated with a third node in the artificial neural network that is farther forward in the forward graph for the artificial neural network than the second node, wherein the sending the control signal is based at least in part on the determining that the other gradient operation has been executed.

10. The one or more non-transitory computer-readable media of claim 6, wherein a second node of the artificial neural network is connected to the first node through one or more nodes of a subgraph, and the second node is farther forward in a forward graph for the artificial neural network than the first node, and the acts further comprising:

determining that a first gradient operation has been executed during the backpropagation, the first gradient operation associated with the second node;

based at least in part on the activation and the determining that the first gradient operation has been executed, executing the subgraph of the artificial neural network during the backpropagation to generate a recomputed activation; and based at least in part on the recomputed activation, generating another gradient for the subgraph, wherein the determining the gradient comprises, based at least in part on the other gradient for the subgraph, executing a second gradient operation during the backpropagation to determine the gradient, the gradient associated with the first node.

11. The one or more non-transitory computer-readable media of claim 10, wherein the activation is stored into the memory that is associated with the second processing unit while at least a portion of the subgraph is executed.

12. The one or more non-transitory computer-readable media of claim 6, wherein the acts further comprise:

storing, during the forward propagation, the activation in a portion of the memory associated with the first processing unit; and deallocating the portion of the memory associated with the first processing unit upon the causing the activation to be stored in the memory associated with the second processing unit.

13. A first processing unit comprising:

one or more processors; and one or more computer-readable media storing instructions executable by the one or more processors, wherein the instructions, when executed, cause the first processing unit to perform acts comprising:

determining, during a forward propagation of a training stage for an artificial neural network, a checkpoint designating a subset of the artificial neural network, the checkpoint comprising an activation associated with a first node in the artificial neural network;

copying, based at least in part on the checkpoint, the activation from a first memory accessible to the first processing unit to second memory that is external to the first processing unit;

sending, based at least in part on the checkpoint, a control signal;

copying, based at least in part on the control signal, the activation from the second memory to the first memory; and determining, during a backpropagation associated with the training stage and based at least in part on the activation, a gradient.

14. The first processing unit of claim 13, wherein the first processing unit comprises a Graphics Processing Unit (GPU).

15. The first processing unit of claim 13, wherein the second memory is associated with a Central Processing Unit (CPU).

16. The first processing unit of claim 13, wherein the first node in the artificial neural network is connected to a second node in the artificial neural network through one or more nodes of a subgraph, and the second node is farther forward in a forward graph for the artificial neural network than the first node, and the acts further comprising:

determining that a gradient operation has been executed during the backpropagation, the gradient operation being associated with the second node, wherein the sending the control signal is based at least in part on the determining that the gradient operation has been executed.

17. The first processing unit of claim 16, wherein the acts further comprise:

determining that another gradient operation has been executed during the backpropagation, the other gradient operation being associated with a third node that is located farther forward in the forward graph for the artificial neural network than the second node, wherein the sending the control signal is based at least in part on the determining that the other gradient operation has been executed.

18. The first processing unit of claim 13, wherein the first node in the artificial neural network is connected to a second node in the artificial neural network through one or more nodes of a subgraph, and the second node is farther forward in a forward graph for the artificial neural network than the first node, the acts further comprising:

determining that a first gradient operation has been executed during the backpropagation, the first gradient operation being associated with the second node;

based at least in part on the activation and the determining that the first gradient operation has been executed, executing a subgraph of the artificial neural network during the backpropagation to generate a recomputed activation; and based at least in part on the recomputed activation, generating another gradient for the subgraph, wherein the determining the gradient comprise, based at least in part on the other gradient, executing a second gradient operation during the backpropagation to determine the gradient, the gradient being associated with the first node.

19. The first processing unit of claim 18, wherein the activation is copied to the second memory while at least a portion of the subgraph is executed.

20. The first processing unit of claim 13, wherein the acts further comprise:

storing the activation in a portion of the first memory; and deallocating the portion of the first memory upon the copying the activation to the second memory.

* * * * *